United States Patent
Chen et al.

(10) Patent No.: US 11,646,696 B2
(45) Date of Patent: May 9, 2023

(54) PHOTOVOLTAIC MODULE PACKING BOX AND PHOTOVOLTAIC MODULE PACKAGE STRUCTURE

(71) Applicant: Xiaoxuan Chen, Shanghai (CN)

(72) Inventors: Xiaoxuan Chen, Shanghai (CN); Dong Chen, Shanghai (CN)

(73) Assignee: Xiaoxuan Chen, Shanghai (CN)

(*) Notice: Subject to any disclaimer, the term of this patent is extended or adjusted under 35 U.S.C. 154(b) by 173 days.

(21) Appl. No.: 17/081,957

(22) Filed: Oct. 27, 2020

(65) Prior Publication Data

US 2022/0131498 A1 Apr. 28, 2022

(30) Foreign Application Priority Data

Oct. 23, 2020 (CN) .......................... 202011147235.5

(51) Int. Cl.
*B65D 81/05* (2006.01)
*H02S 99/00* (2014.01)
*B65D 85/30* (2006.01)

(52) U.S. Cl.
CPC ............ *H02S 99/00* (2013.01); *B65D 81/052* (2013.01); *B65D 85/30* (2013.01)

(58) Field of Classification Search
CPC ...... B65D 81/052; B65D 19/40; B65D 19/42; B65D 85/30; B65D 81/053; B65D 2203/04
USPC ....... 206/386, 600, 586, 453, 597, 451, 452; 108/6, 7
See application file for complete search history.

(56) References Cited

U.S. PATENT DOCUMENTS

| | | | | |
|---|---|---|---|---|
| 5,649,491 A | * | 7/1997 | Zaguroli, Jr. ............ | B65G 7/08 108/9 |
| 6,298,994 B1 | * | 10/2001 | Debrunner ............. | B65D 19/20 229/199 |
| 7,575,641 B2 | * | 8/2009 | Joseph ...................... | F28G 9/00 165/95 |
| 8,453,862 B2 | * | 6/2013 | Wang ..................... | B65D 37/00 220/9.3 |

(Continued)

FOREIGN PATENT DOCUMENTS

| CN | 202072064 | 12/2011 |
|---|---|---|
| CN | 102502502090 | 5/2012 |

(Continued)

OTHER PUBLICATIONS

Jan. 1, 2022, First Office Action for Chinese Application No. 202011147235.5 (13 Pages).

(Continued)

*Primary Examiner* — Steven A. Reynolds
(74) *Attorney, Agent, or Firm* — Knobbe, Martens, Olson & Bear, LLP

(57) ABSTRACT

A photovoltaic module packing box and a photovoltaic module package structure are provided. The photovoltaic module packing box includes a tray having an accommodation space; a support plate having an edge hinged to an edge of the tray, and the support plate is lapped on the tray; an airbag assembly arranged in the accommodation space; an air valve assembly connected to the airbag assembly by a pipeline; an enclosure frame connected to the support plate and configured to enclose, together with the support plate, a receiving space for photovoltaic modules, and the enclosure frame includes a fixation part and a movable part; the (Continued)

fixation part is fixed to the support plate with one side thereof configured as an open structure; the movable part is detachably connected to the open structure of the fixation part, and the movable part and the fixation part together form an annular structure.

18 Claims, 8 Drawing Sheets

(56) References Cited

U.S. PATENT DOCUMENTS

| | | | |
|---|---|---|---|
| 9,156,586 B2* | 10/2015 | Girsh | B65D 19/44 |
| 9,669,985 B1* | 6/2017 | Hudson | B65D 81/057 |
| 2010/0212982 A1* | 8/2010 | Lin | B65D 19/40 |
| | | | 180/124 |
| 2015/0189964 A1* | 7/2015 | Gutierrez | B65D 85/187 |
| | | | 206/292 |
| 2018/0127147 A1 | 5/2018 | Embleton et al. | |

FOREIGN PATENT DOCUMENTS

| | | |
|---|---|---|
| CN | 202897127 | 4/2013 |
| CN | 203229074 | 10/2013 |
| CN | 104986443 | 10/2015 |
| CN | 205060248 | 3/2016 |
| CN | 105775324 | 7/2016 |
| CN | 106542484 | 3/2017 |
| CN | 207684135 | 8/2018 |
| CN | 110550319 | 12/2019 |
| CN | 210259509 | 4/2020 |
| CN | 111332607 | 6/2020 |
| CN | 211593580 | 9/2020 |
| KR | 20130087120 | 8/2013 |

OTHER PUBLICATIONS

May 11, 2022, Second Office Action for Chinese Application No. 202011147235.5 (17 pages).
Chinese Office Action dated Jan. 5, 2022 for Chinese Patent Application No. 202011147235.5. 10 pages.

* cited by examiner

PHOTOVOLTAIC MODULE PACKING BOX AND PHOTOVOLTAIC MODULE PACKAGE STRUCTURE

CROSS-REFERENCE TO RELATED DISCLOSURES

The present application claims priority to Chinese Patent Application No. 202011147235.5, filed on Oct. 23, 2020, the content of which is incorporated herein by reference in its entirety.

TECHNICAL FIELD

The present disclosure relates to the technical field of photovoltaic module packing, and particularly, to a photovoltaic module packing box and a photovoltaic module package structure.

BACKGROUND

After manufacture, a photovoltaic module is generally packed and protected by a special packing box in order to prevent damage to the photovoltaic module during transportation. In a common package structure for the photovoltaic module, the photovoltaic modules are placed uprightly and arranged on a tray in sequence along a thickness direction. The photovoltaic modules are fixed to the tray by a packing rope. An enclosure frame is provided at the periphery of the photovoltaic modules to increase the fixation strength. That is to say, since the photovoltaic modules are accommodated in the enclosure frame, when packing and unpacking for use, the enclosure frame must be entirely removed, causing inconvenience in packing and unpacking of the photovoltaic modules.

In addition, due to a small thickness of the photovoltaic module, the contact area between its bottom surface and the tray is relatively small. During the upright placement, the photovoltaic module is easily inclined or even fallen down due to slight vibration. Moreover, at least two persons are required to complete the packing work, and one of them needs to always hold the photovoltaic modules after they have been uprightly placed, consuming too much manpower.

SUMMARY

The present disclosure provides a photovoltaic module packing box and a photovoltaic module package structure, to facilitate packing and unpacking of the photovoltaic modules and, at the same time, preventing the photovoltaic modules from falling during packing. Therefore, only one person is necessary to complete the whole packing process of the photovoltaic modules, thereby saving manpower and improving efficiency.

In a first aspect of the present disclosure, a photovoltaic module packing box is provided, including: a tray having an accommodation space; a support plate, wherein an edge of the support plate is hinged to an edge of the tray facing away from the accommodation space, and the support plate is lapped on the tray in a horizontal state; an airbag assembly arranged in the accommodation space; an air valve assembly connected to the airbag assembly by a pipeline; and an enclosure frame connected to the support plate and configured to enclose, together with the support plate, a receiving space for at least one photovoltaic module, and the enclosure frame includes a fixation part and a movable part connected to the fixation part; wherein the fixation part is fixed to the support plate, and one side of the fixation part is configured as an open structure; and wherein the movable part is detachably connected to the open structure of the fixation part, and the movable part and the fixation part together form an annular structure.

In an embodiment, the photovoltaic module packing box further includes a stop mechanism, the stop mechanism is connected to the support plate and the tray, respectively, in order to limit rotation of the support plate relative to the tray within a set angle range.

In an embodiment, the stop mechanism includes a pin shaft and a stop plate; the pin shaft is fixed to a side wall surface of the support plate; and one end of the stop plate is fixed to a side wall surface of the tray, the stop plate has an arc hole, and the pin shaft is sliding-fitted with the arc hole.

In an embodiment, the set angle range is a range from 3° to 8°.

In an embodiment, the air valve assembly includes an inflation valve and a deflation valve; the inflation valve and the pipeline are integrally formed; and the deflation valve is arranged on a side wall of the pipeline.

In an embodiment, the deflation valve includes an air nozzle and a valve cap, and the valve cap is threaded with the air nozzle; and an air hole is provided in a side wall of the air nozzle.

In an embodiment, at least one partitioning plate is provided in the accommodation space, and the at least one partitioning plate equally divides the accommodation space into at least two fixed spaces; and the airbag assembly includes at least two airbags which are communicated with each other through a connection hose, and one of the at least two airbags is arranged in a respective one of the at least two fixed spaces.

In an embodiment, the photovoltaic module packing box further includes a plurality of corner protectors, each of the plurality of corner protectors is provided with a wrapping space for wrapping one corner of the at least one photovoltaic module.

In an embodiment, one side of the corner protector has an emboss, and the other side of the corner protector has a dent, the emboss of the corner of one of the at least one photovoltaic module is cooperated with the dent of the corner of an adjacent one of the at least one photovoltaic module.

In an embodiment, at least two magnet pieces are fixed on two sides of the corner protector, respectively, and one of the at least two magnet pieces of the corner protector of one of the at least one photovoltaic module is fixed by magnetic adsorption to the other one of the at least two magnet pieces of the corner protector of an adjacent one of the at least one photovoltaic module.

In an embodiment, the movable part is connected to the fixation part by a velcro.

In an embodiment, a bottom of the fixation part has a first flanging fitted to a surface of the support plate.

In an embodiment, the first flanging is provided with a through hole for a packing rope to pass through.

In an embodiment, the photovoltaic module packing box further includes a press plate for pressing the packing rope, wherein the press plate is embedded into an interior of the first flanging.

In an embodiment, one end of the pressure plate has at least one groove for a packing rope to pass through.

In an embodiment, the fixation part includes a first panel and two side plates connected to two ends of the first panel, and each of the two side plates extends in a direction facing away from the first panel to form an open structure; and the movable part includes a second panel, and two ends of the second panel are connected to the two side plates, respectively.

In an embodiment, photovoltaic module packing box further includes an adjustment baffle; wherein at least one elongated hole is provided in the first panel, and the at least one elongated hole extends in a height direction of the first panel; at least one slot is provided in the second panel, and the at least one slot is arranged corresponding to the at least one elongated hole; and one side of the adjustment baffle passes through one of the at least one elongated hole and is buckled into a corresponding one of the at least one slot.

In an embodiment, the side plate is also provided with a scale plate.

In an embodiment, an inner wall of the side plate is provided with a velcro for fixing the at least one photovoltaic module.

In an embodiment, a height of the side plate is gradually decreased in a direction from the first panel toward the second panel.

In an embodiment, a top surface of the side plate is configured as an inclined structure, and an inclining angle of the top surface of the side plate is in a range from 15° to 60°.

In a second aspect of the present disclosure, a photovoltaic module package structure is provided, including a plurality of photovoltaic modules and any one of the photovoltaic module packing box according to the first aspect, wherein the plurality of photovoltaic modules is accommodated in the photovoltaic module packing box, and two ends of the plurality of photovoltaic modules are fixed to an inner wall of the enclosure frame by a velcro, respectively.

In a third aspect of the present disclosure, another photovoltaic module package structure is provided, including a plurality of photovoltaic modules and any one of the photovoltaic module packing box according to the first aspect, wherein a bottom of the fixation part has a first flanging fitted to a surface of the support plate, and the first flanging is provided with a through hole for a packing rope to pass through, wherein the plurality of photovoltaic modules is accommodated in the packing box, and two ends of the plurality of photovoltaic modules are fixed to an inner wall of the enclosure frame by a velcro, respectively, and wherein the packing rope penetrates into the photovoltaic module packing box from the through hole, and bundles the plurality of photovoltaic modules as an entirety The technical solution according to the present disclosure can achieve the following beneficial effects:

The photovoltaic module packing box according to the present disclosure includes a tray and an enclosure frame. The enclosure frame is connected to the tray and encloses an accommodation space of the photovoltaic module together with the tray. The enclosure frame includes a fixation part and a movable part which are connected to each other. The fixation part is fixed to the tray, and one side of the fixation part is configured as an open structure. The movable part is detachably connected to the open structure of the fixation part, and the movable part and the fixation part together form an annular structure. When packing or unpacking the photovoltaic modules, only the movable part is required to be removed. That is, the photovoltaic modules may be placed or taken from the open structure of the fixation part, thereby facilitating packing and unpacking of the photovoltaic module.

In addition, the inclination angle of the support plate may be adjusted through the cooperation of the support plate and the tray, so that the photovoltaic module may be inclined to a side of the fixation part facing away from the open structure, and supported by the fixation part, thereby preventing the photovoltaic modules from falling toward the open structure.

It should be understood that the above summary and the following detailed description are only exemplary, which shall not be interpreted as limiting the present disclosure.

BRIEF DESCRIPTION OF DRAWINGS

In order to better illustrate specific embodiments of the present disclosure, the accompanying drawings used in the description of the embodiments will be introduced below. It is appreciated that, the accompanying drawings in the following description are only some embodiments of the present disclosure, rather than all of them.

REFERENCE SIGNS

Figure 1:
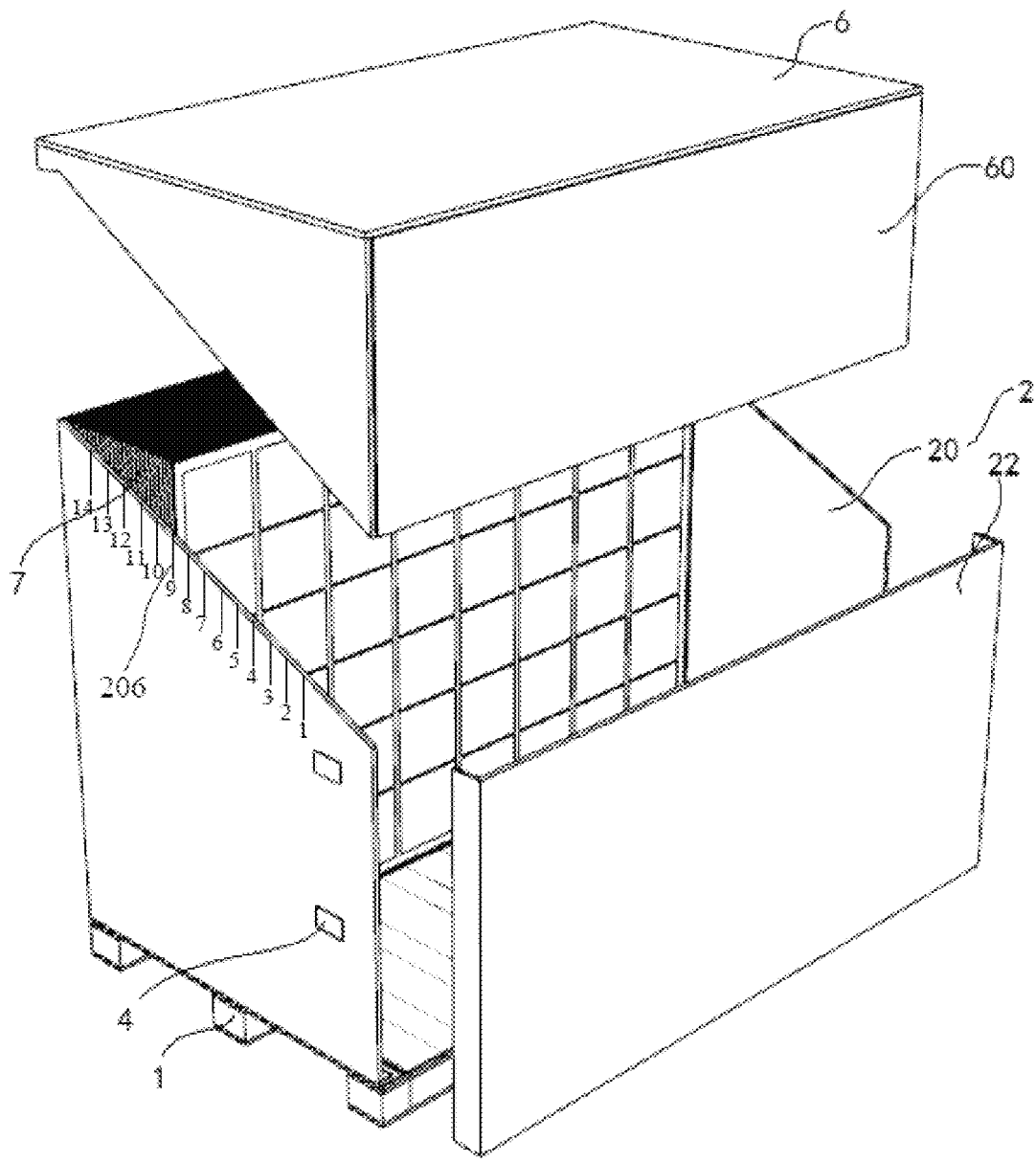
FIG. 1 is a partial schematic structural diagram of a package structure for a photovoltaic module according to an embodiment of the present disclosure.
Figure 2:
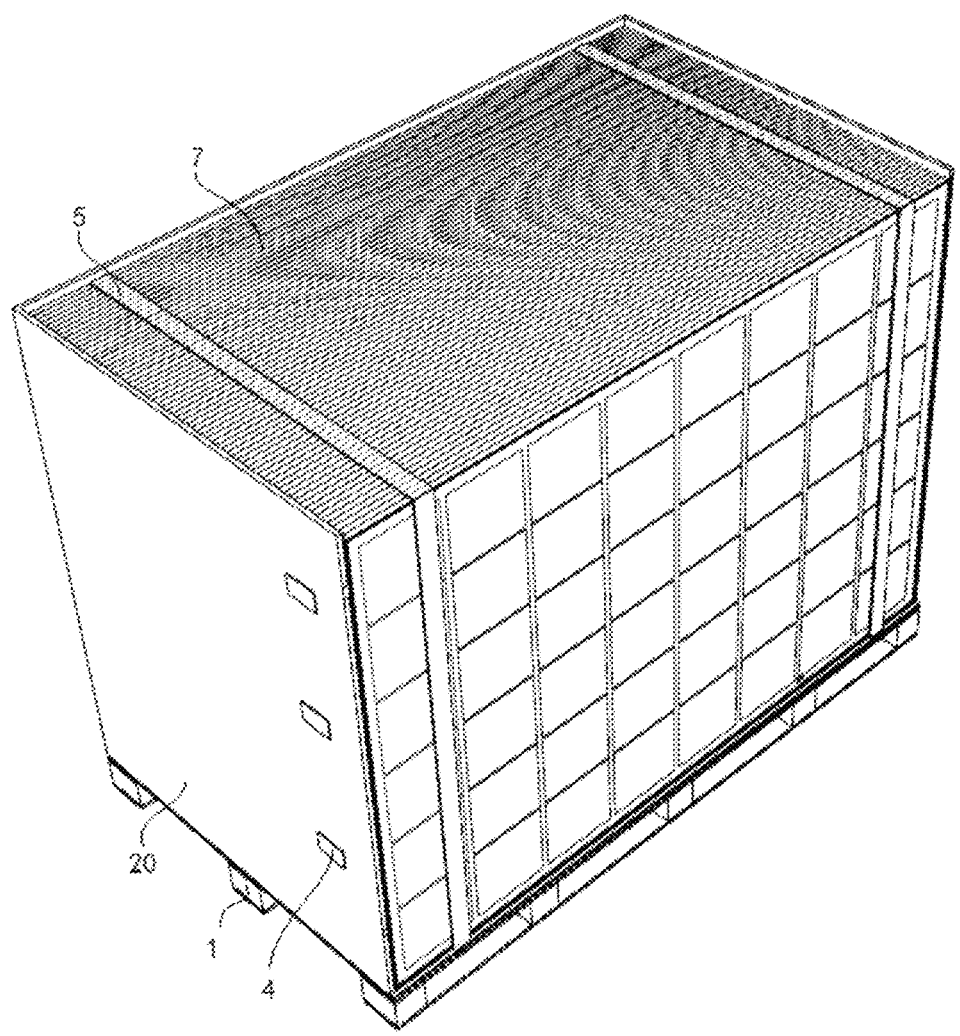
FIG. 2 is a partial schematic structural diagram of a package structure for a photovoltaic module according to another embodiment of the present disclosure.
Figure 3:
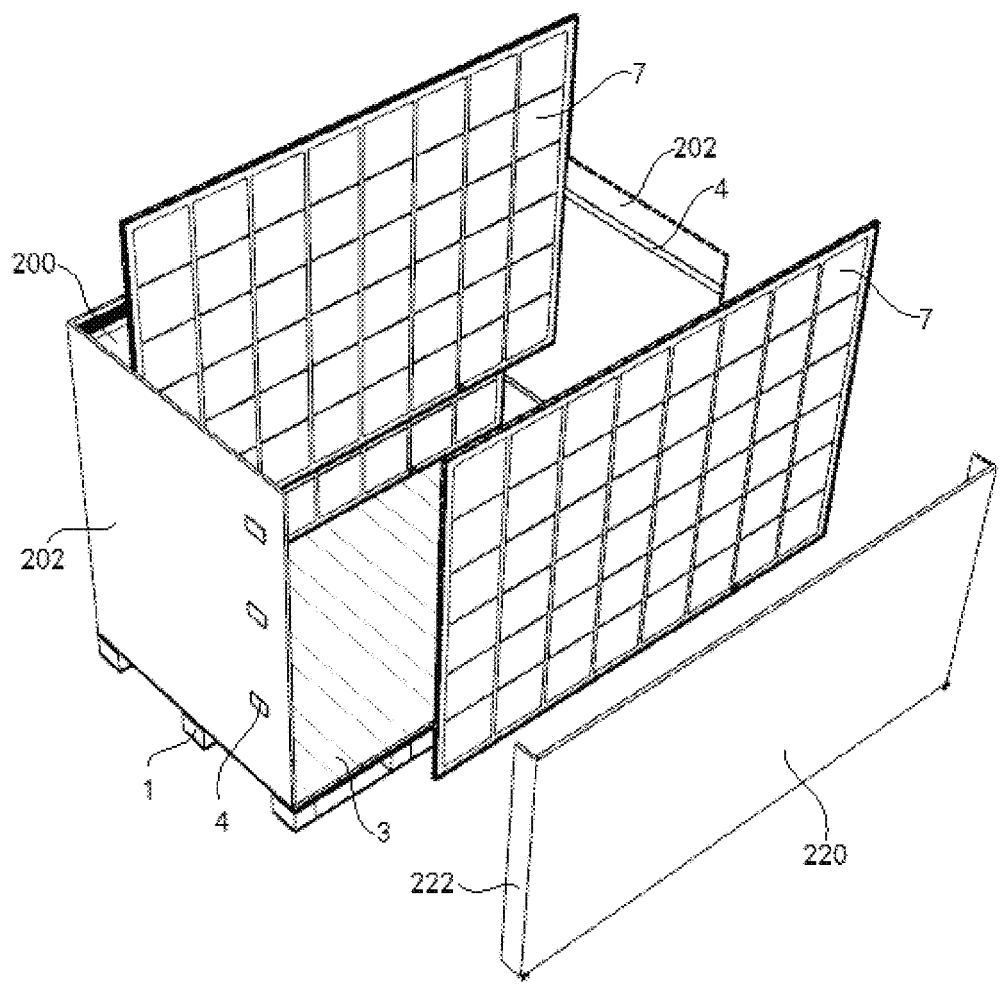
FIG. 3 is an exploded schematic diagram of a package structure for a photovoltaic module according to an embodiment of the present disclosure.

1—tray;
  11—support plate;
  12—stop plate;
    121—arc hole;
  13—pin shaft;
  14—fixation space;
  15—airbag;
  16—connection hose;
2—enclosure frame;
  20—fixation part;
    200—first panel;
    202—side plate;
    204—first flanging;
    206—scale plate;
  26—through hole;
  22—movable part;
    220—second panel;
    222—second flanging;
3—press plate;
  30—groove;
  32—lug;
4—velcro
5—packing rope;
6—top cover;
  60—extension part;
7—photovoltaic module;
  70—corner protector;
    701—emboss;
    702—dent.

DESCRIPTION OF EMBODIMENTS

In order to make the object, technical solutions, and advantages of the present disclosure clear, the following description further describes the present disclosure in detail with reference to the accompanying drawings and the embodiments. It should be understood that the specific embodiments described here are only used to explain the present disclosure, and are not intended to limit the present disclosure.

In the present disclosure, unless expressly stipulated and limited, the terms "first" and "second" are only used for descriptive purposes, and shall not be understood as indicating or implying relative importance. Unless expressly stipulated and limited, the term "a plurality of" refers to two or more. The terms "connected" and "fixed" should be understood in a broad sense. For example, "connection" may be a fixed connection, a detachable connection, or an integral connection, or an electrical connection. It can be directly connected, or indirectly connected through an intermediate medium. For those skilled in the art, the specific meanings of the above-mentioned terms in the present disclosure may be understood according to specific situations.

In this specification, it should be understood that the terms such as "above" and "under" described in the embodiment of the present disclosure are described according to the perspective of the drawings, and shall not be construed to limit the present disclosure. In addition, in the context, it should be understood that when an element is located "above" or "under" another element, the element can not only be directly located "above" or "under" the other element, but also be indirectly located "above" or "under" another element through an intermediate element.

As shown in FIGS. 1-10, an embodiment of the present disclosure provide a photovoltaic module package structure, the photovoltaic module package structure includes a plurality of photovoltaic modules 7 and a packing box. The photovoltaic modules 7 are accommodated in the packing box. Two ends of the plurality of photovoltaic modules 7 may be fixed to an inner wall of the enclosure frame 2 by a velcro 4.

In an embodiment of the present disclosure, the photovoltaic module package structure may further include a packing rope 5. The packing rope 5 penetrates into the packing box from a through hole 26 provided in the packing box, to bundle the plurality of photovoltaic modules 7 as a whole.

In an embodiment of the present disclosure, the photovoltaic module packing box includes a tray 1 and an enclosure frame 2. The enclosure frame 2 is connected to a support plate and encloses together with the support plate an accommodation space for the photovoltaic assemblies 7. The enclosure frame 2 includes a fixation part 20 and a movable part 22 connected to each other. The fixation part 20 is fixedly connected to the support plate, and one side of the fixation part 20 is configured as an open structure. The movable part 22 is detachably connected at the open structure of the fixation part 20. The movable part 22 and the fixation part 20 enclose into an annular structure. When the photovoltaic modules 7 are packed or unpacked, only the movable part 22 is required to be removed, that is, the photovoltaic modules may be placed into or taken from the open structure of the fixation part 20, thereby improving convenience in packing and unpacking the photovoltaic modules. In addition, since the fixation part 20 is fixed to the support plate, the photovoltaic module 7 may be supported and fixed by cooperation of the fixation part 20 and the support plate, thereby preventing the photovoltaic modules 7 from falling toward the interior of the packing box during packing the photovoltaic modules 7 or unpacking the photovoltaic modules 7 for use.

For ease of description, in the embodiments of the present disclosure, a length direction of the photovoltaic modules 7 is defined as a first direction, and a thickness direction of the photovoltaic modules 7 is defined as a second direction.

In an embodiment, the tray 1 may be made of a wood material, and may be a flat plate structure or a partially hollow strip structure. The photovoltaic modules 7 adopts an upright placement, in which the bottom of each of the photovoltaic module 7 is supported on the support plate, and a plurality of photovoltaic modules 7 are arranged in sequence along the second direction. The open structure is provided at one side of the fixation part 20 along the second direction. That is, at two sides of the photovoltaic module 7 along the thickness direction, one side of the photovoltaic module 7 is protected by a portion of the fixation part 20, and the other side of the photovoltaic module 7 is an open structure and is protected by the movable part 22. The two ends of the photovoltaic modules 7 along the first direction are fixed to the fixation part 20 respectively, so that each of the photovoltaic modules 7 is fixed by the fixation part 20 in order to prevent the photovoltaic modules 7 from falling toward the interior of the packing box.

However, for a common packing box, since the photovoltaic modules 7 adopts an upright placement, the bottom of the packing box is horizontal, it is difficult to ensure that the upright photovoltaic modules will not incline toward the exterior of the packing box. That is, in this embodiment, if the bottom of the packing box is horizontal, it is difficult to ensure that the photovoltaic modules will not incline toward the open structure.

As a result, in this embodiment, a combined structure formed by a tray, a support plate 11, an airbag assembly and an air valve assembly is provided at the bottom of the packing box. The tray has an accommodation space at a position close to the open structure. An edge of a side of the support plate 11 is hinged to an edge of a side of tray facing away from the accommodation space. The support plate 11 may be lapped on the tray in a horizontal state. The airbag assembly is arranged in the accommodation space. The air valve assembly may be connected to the airbag assembly through a pipeline.

Before placing the photovoltaic modules into the photovoltaic module packing box, the airbag assembly may be inflated by the air valve assembly so as to swell the airbag assembly. The airbag assembly may gradually lift up the support plate 11 lapped on the tray so as to make the support plate 11 rotate relative to the tray. When the support plate 11 rotates to a proper angle, stop inflating the airbag assembly. At this time, the support plate 11 assumes a slightly inclined state. That is, the height of the support plate 11 at the position close to the open structure is greater than that of the support plate 11 at the position where the support plate 11 is hinged to the tray.

In this case, when the photovoltaic modules are placed into the packing box one by one, the photovoltaic modules may be inclined to a side of the fixation part facing away from the open structure, and supported by the fixation part, thereby preventing the photovoltaic modules from falling toward the open structure. After the photovoltaic modules have been packed in the box, the air bag assembly may be deflated through the air valve assembly, so that the support plate 11 may rotate back to a horizontal state in order to bundle the packed photovoltaic modules.

It should be noted that, as the number of the photovoltaic modules in the packing box gradually increases, the downward pressure on the support plate 11 gradually increases, that is, the pressure that the airbag assembly bears also gradually increases. Since the airbag assembly may be made of a softer elastic material, such as soft rubber, etc., when the pressure that the airbag assembly bears gradually increases, the airbag assembly may be gradually squeezed to deform, so that a distance between the support plate 11 and the tray gradually reduces. When the photovoltaic modules are completely packed into the packing box, the distance between the support plate 11 and the tray may exactly reach zero.

Therefore, when the airbag assembly is deflated, the distance between the support plate 11 and the tray is reduced, therefore the impact force between the support plate 11 and the tray may be reduced as the support plate 11 rotates back, thereby reducing the vibration of the entire photovoltaic modules, even to zero vibration, avoiding damage of the photovoltaic modules due to vibration, and ensuring the structural integrity of the photovoltaic modules and the packing condition of the photovoltaic modules in the packing box.

In an embodiment of the present disclosure, the photovoltaic module packing box further includes a stop mechanism. The stop mechanism is connected to the support plate 11 and the tray, respectively, so as to limit rotation of the support plate 11 relative to the tray within a set angle range.

The angle between the support plate 11 and the tray should not be too large, otherwise the pressure of the photovoltaic modules on the fixation part may be too large, causing the fixation part to be damaged and the risk of falling of the photovoltaic modules.

For example, the set angle range may be from 3° to 8°. For example, the angle between the support plate 11 and the tray may be 4°, 5°, 6°, or 7°. If the angle between the support plate 11 and the tray is greater than 8°, the fixation part may be subjected to an excessive pressure from the photovoltaic modules and may be easily damaged. If the angle between the support plate 11 and the tray is less than 3°, the photovoltaic modules are difficult to assume a slight inclination in a direction facing away from the open structure, thereby causing the photovoltaic modules to incline toward the open structure due to vibration.

Figure 8:
FIG. 8 is a schematic diagram of a support plate in an inclined state.

In an embodiment, as shown in FIG. 8, the stop mechanism may include a pin shaft 13 and a stop plate 12. The pin shaft 13 is fixed on a side wall surface of the support plate 11. One end of the stop plate 12 is fixed on a side wall surface of the tray. The stop plate 12 has an arc hole 121. The pin shaft 12 is sliding-fitted with the arc hole 121.

It can be understood that, during the rotation of the support plate 11, the pin shaft 13 may slide in the arc hole 121, and a movement track of the pin shaft 13 is a circular arc centered at the hinge joint between the support plate 11 and the tray. By the cooperation of the arc hole 121 and the pin shaft 13, an opening angle of the support plate 11 may be limited, thereby avoiding a too large rotation angle of the support plate 11. Meanwhile, the stop plate 12 may limit the vibration of the support plate 11 in the first direction, to ensure the stability of the rotation of the support plate 11.

In an embodiment, the air valve assembly may include an inflation valve and a deflation valve. The inflation valve is communicated with the airbag assembly through a pipeline, and the inflation valve and the pipeline may be integrally formed. The deflation valve is arranged on a side wall of the pipeline.

The inflation valve may have a spherical or oblate shape. The airbag assembly may be inflated by squeezing the inflation valve. In practical operation, the inflation valve may be squeezed manually by hand or foot to inflate the airbag assembly. In order to facilitate the operation, the inflation valve may be arranged outside of the tray.

In an embodiment, the deflation valve includes an air nozzle and a valve cap. The valve cap is threaded with the air nozzle. An air hole is provided on a side wall of the air nozzle.

When the valve cap is tightly threaded on the air nozzle, the valve cap may block the air hole on the air nozzle. At this time, the airbag assembly may be normally inflated through the inflation valve. When the valve cap is loosened to expose the air hole, the air in the airbag assembly may be deflated through the air hole. Therefore, by the cooperation of the valve cap with the air nozzle, the operation of inflating or deflating the airbag assembly may be more convenient and quick.

Figure 7:
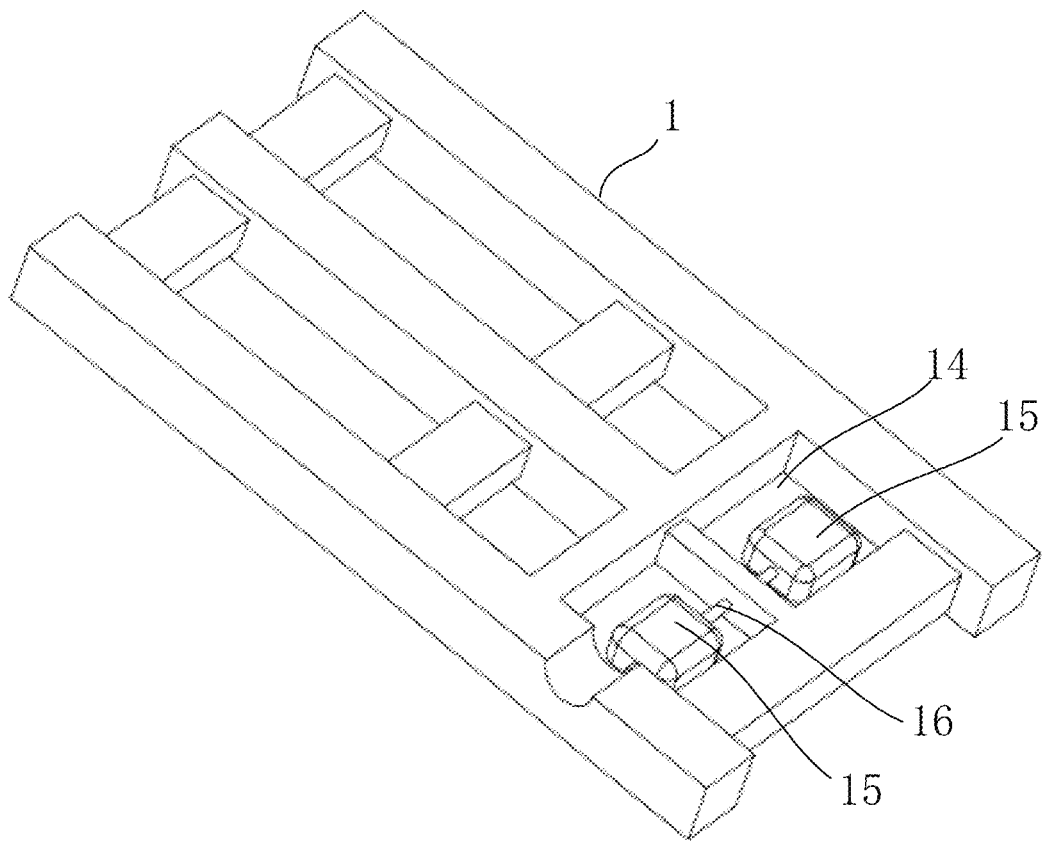
FIG. 7 is a schematic structural diagram of a tray.

In an embodiment, as shown in FIG. 7, at least one partitioning plate is provided in the accommodation space, and equally divides the accommodation space into at least two fixed spaces 14. The airbag assembly includes at least two airbags 15 which are communicated with each other through a connection hose 16, and one of the at least two airbags 15 is arranged in one of the at least two fixed spaces 14.

In this embodiment, the at least two fixed spaces 14 may be evenly distributed in the first direction, so that more than two airbags 15 may exert a more balanced support force to the support plate 11 in the first direction, thereby ensuring the stability of rotation of the support plate 11 and the stability of the support for the photovoltaic modules on the support plate 11.

It can be understood that, holes may be provided in the partitioning plate to facilitate the connection hose 16 to pass through, thereby realizing communication between two adjacent airbags 15.

In an embodiment, the photovoltaic module packing box may also include a corner protector. The corner protector is provided with a wrapping space for wrapping the corners of the photovoltaic module.

In an embodiment, four corners of one photovoltaic module 7 may be respectively wrapped by the corner protector 70. The corner protector 70 may be made of a paper material, a plastic material, or a rubber material to protect the corners of the photovoltaic module 7 and prevent damages such as collisions to the corner of the photovoltaic module 7.

A fixation structure, such as a double-sided tape or a velcro, may be provided on a side of the corner protector 70 along the first direction, so that two ends of the photovoltaic module 7 along the first direction may be respectively fixed to the fixation part 20 through the fixation structure on the corner protector 70, instead of directly connecting the photovoltaic module 7 to the fixation part 20. Therefore, it is not necessary to change an external structure of the photovoltaic module 7. That is, photovoltaic modules 7 having different external structures may be packed by the packing box according to the embodiments of the present disclosure, thereby improving versatility of the packing box.

Figure 9:
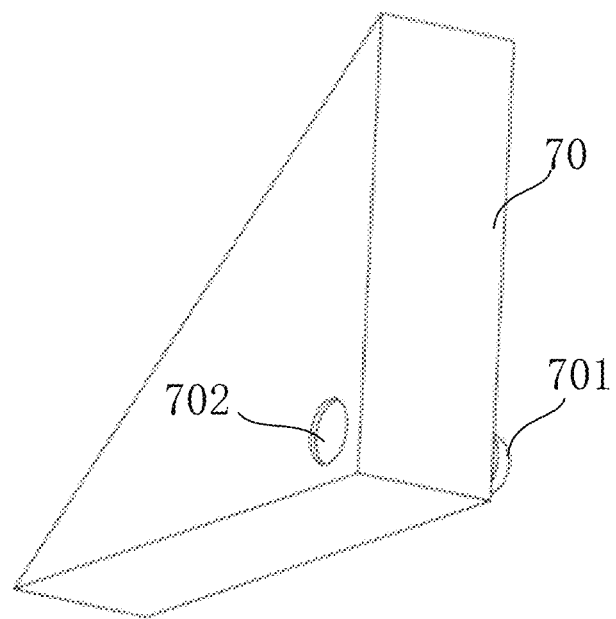
FIG. 9 is a schematic structural diagram of a corner protector under a perspective.
Figure 10:
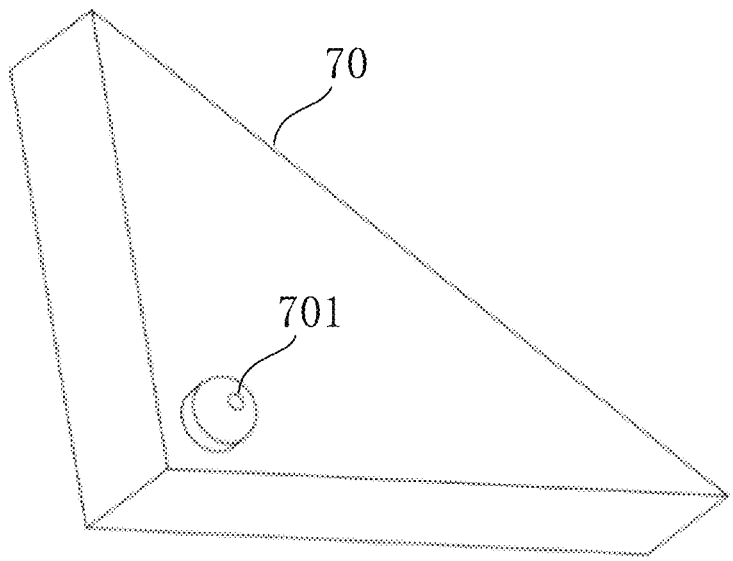
FIG. 10 is a schematic structural diagram of the corner protector under another perspective.

In an embodiment, as shown in FIGS. 9 and 10, one side of the corner protector has an emboss 701, and the other side of the corner protector has a dent 702. The emboss 701 at the corner of one photovoltaic module is cooperated with the dent 701 at the corner of an adjacent photovoltaic module.

Before packing, the corner protectors may be installed on the respective photovoltaic modules, so that the corner protectors on the adjacent photovoltaic module may be positioned by the cooperation of the emboss 701 with the dent 702. Therefore, after a plurality of photovoltaic modules is stacked, the plurality of photovoltaic modules forms a pack with a relatively fixed position through the cooperation of the emboss 701 with the dent 702, thereby facilitating packing of multiple photovoltaic modules into the packing box at one time, and improving the packing efficiency. Meanwhile, the packing posture of each photovoltaic module is also ensured, thereby avoiding the movement of photovoltaic modules during the packing process.

It is appreciated that, the photovoltaic modules may be placed into the packing box one by one. The photovoltaic module placed later in the packing box may cooperate with the emboss 701 or the dent 702 at the corner protector on the adjacent photovoltaic module in the packing box through the emboss 701 or the dent 702 thereof during the placing process, thereby ensuring the position accuracy of the photovoltaic module placed later in the packing box. Meanwhile, the restriction of the emboss 701 and the dent 702 may prevent the latter photovoltaic module placed later in the packing box from tilting or falling.

In order to facilitate the contact cooperation between the emboss 701 and the dent 702, the surface of the emboss 701 may be a spherical surface, and the inner surface of the dent 702 may be an arc surface cooperating with the spherical surface of the emboss 701.

In an embodiment, two magnet pieces may be fixed on two sides of each corner protector, respectively. One of the two magnet pieces on the corner protector of one photovoltaic module is fixed by magnetic adsorption to the other one of the two magnet pieces on the corner protector of an adjacent photovoltaic module.

Therefore, through the adsorption of the magnet pieces, a modular structure with a relatively fixed positions of the photovoltaic modules may be formed, thereby ensuring the packing posture of the photovoltaic modules.

In an embodiment, the movable part 22 is connected to the fixation part 20 through the velcro 4 arranged on the corner protector 70, thereby achieving a simple structure, a firm attachment, which is reusable and traceless. It is also possible that, the movable part 22 and the fixation part 20 may be connected by other detachable structures, such as a double-sided tape.

The movable part 22 may be connected to the inner side of the fixation part 20, and may slide inside the fixation part 20 along the second direction, so that the size of the internal space of the enclosure frame 2 is adjustable. Therefore, different numbers of the photovoltaic module 7 may be placed in the packing box, causing the packing box according to the present disclosure more adaptable. For example, after unpacking some of the photovoltaic modules 7, it is only required to move the movable part 22 inward and fix it to achieve the packing of the remaining photovoltaic modules 7. Alternatively, the movable part 22 may also be connected to the exterior of the open structure of the fixation part 20, so that the movable part 22 abuts against the fixation part 20. Therefore, the size of the internal space of the enclosure frame 2 remains unchanged.

In some embodiments, the fixation part 20 includes a first panel 200 and side plates 202 which are connected to two ends of the first panel 200. The side plates 202 extend in a direction facing away from the first panel 200 to form an open structure. The movable part 22 includes a second panel 220, and two ends of the second panel 220 are respectively connected to the side plates 202. When the size of the enclosure frame remains unchanged, the size of the fixation part 20 may be maximized according to this embodiment, so that the fixation part 20 may fix more photovoltaic modules 7.

In an embodiment, two ends of the movable part 22 along the first direction may be respectively provided with a second flanging 222, and the two ends of the movable part 22 are connected to the side plate 202 through the second flanging 222, thereby increasing the contact area between the movable part 22 and the side plate 202, and improving the reliability of the connection.

In an embodiment, the photovoltaic module packing box may also include an adjustment baffle. At least one elongated hole is provided in the first panel, and extends in a height direction of the first panel. At least one slot is provided in the second panel. The position of a slot corresponds to the position of an elongated hole. One side of the adjustment baffle passes through the elongated hole and then is buckled into the slot.

When the length of the photovoltaic module in the first direction is less than the distance between the two side plates, a larger space may be generated between the photovoltaic module and the side plates, causing that the photovoltaic module is easily move. For this purpose, in this embodiment, the adjustment baffle may be inserted into the corresponding elongated hole, and buckled into the slot in the second panel to achieve fixation, so that the adjustment baffle may reduce the size of the fixation part in first direction. The restriction for the photovoltaic modules having a smaller size may be achieved by the cooperation of the side plates of the fixation part, the adjustment baffle, the first panel and the second panel, thereby realizing the versatility for the photovoltaic module packages having different sizes.

In an embodiment, in order to visually display the number of photovoltaic modules in the packing box and record the number of photovoltaic modules that have been taken out of the packing box, a scale plate 206 may be provided on the side plate, so that the number of photovoltaic modules remained in the packing box and the number of photovoltaic modules that have been taken out may be directly obtained by observing the corresponding scale graduation of the photovoltaic modules in the packing box on the scale plate, as shown in FIG. 1.

In an embodiment, the inner wall of the side plate 202 is provided with a velcro 4 for fixing the photovoltaic module 7. It is understandable that two ends of the photovoltaic module 7 should be respectively provided with a corresponding velcro, for example, at each corner protector 70, so that the photovoltaic module 7 and the side plate 202 are fixed to each other through the velcro 4. The velcro 4 may be provided at positions corresponding to respective photovoltaic modules 7, so that each of the photovoltaic modules 7 is fixed by a separate velcro 4. Alternatively, a strip velcro 4 extending in the second direction may be provided to fix all of the photovoltaic modules 7 by the same velcro 4.

In an embodiment, the height of the side plate 202 is gradually decreased along a direction from the first panel 200 toward the second panel 220. On the one hand, the side plate 202 has a higher height at a side close to the first panel 200, which may increase the connection strength between the side plate 202 and the first panel 200, thereby increasing the support strength of the fixation part 20 and preventing the photovoltaic modules 7 from falling. On the other hand, the side plate 202 has a lower height at a side facing away from the first panel 200, which may facilitate the placement of the photovoltaic modules 7.

In an embodiment, the top surface of the side plate 202 is configured as an inclined structure, which simplifies the structure of the side plate 202 and provides higher continuity to the side plate 202, so as to prevent the side plate 202 from being damaged. It can be understood that, the top surface of the side plate 202 may be also configured as a stepped structure or a curved structure. When the top surface of the side plate 202 is configured as an inclined structure, the inclination angle of the top surface of the side plate 202 is in a range from 15° to 60°, preferably in a range from 30° to 40°, e.g., the inclination angle may be 15°, 17°, 19°, 20°, 22°, 25°, 28°, 30°, 33°, 35°, 38°, 40°, 42°, 45°, 48°, 50°, 52°, 55°, 57° or 60° etc., which may facilitate the placement of the photovoltaic modules 7, and ensure the connection strength of the second panel 200. When the inclination angle is less than 15°, the height of the side plate 202 does not change significantly. When the inclination angle is greater than 60°, the height of the side of side plate 202 close to the movable part 22 is too small, which may adversely affect connection of the movable part 22.

In an embodiment, the bottom of the fixation part 20 has a first flanging 204 which is attached to the surface of the support plate so as to increase the contact area between the fixation part 20 and the support plate, thereby increasing the reliability of the connection of the fixation part 20, and preventing the fixation part 20 from falling off from the support plate.

In an embodiment, the first flanging 204 has a through hole 26 for the packing rope 5 to pass through. The through hole 26 is provided at a side of the first flanging 204 along the second direction. That is, the through hole 26 is provided at a section of the first flanging 204 corresponding to the first panel 200, and at least two through holes 26 are distributed along the first direction at intervals. The packing rope 5 may enter into the packing box through the through hole 26, and then bundle the photovoltaic modules 7 in the packing box. A plurality of photovoltaic modules 7 is bundled as an entirety by the packing rope 5 and fixed in the packing box, thereby further increasing the reliability of packing the photovoltaic modules 7 and avoiding collision or scratches between adjacent photovoltaic modules 7.

In an embodiment, two through holes 26 are provided on the first flanging 204, and the two through holes 26 respectively correspond to the two ends of the photovoltaic module 7. Along the first direction, the through hole 26 is located in the coverage of the corner protector 70, so that the packing rope 5 is restricted to the corner protector 70 in order to avoid the packing rope 5 from scratching or strangling the photovoltaic module 7. Along the first direction, the through hole 26 is located outside the coverage of the first flanging 204 in order to prevent the first flanging 204 from interfering with the packing rope 5 which may cause the packing rope 5 difficult to pass through or difficult to tightly bundle the photovoltaic modules 7.

Figure 4:
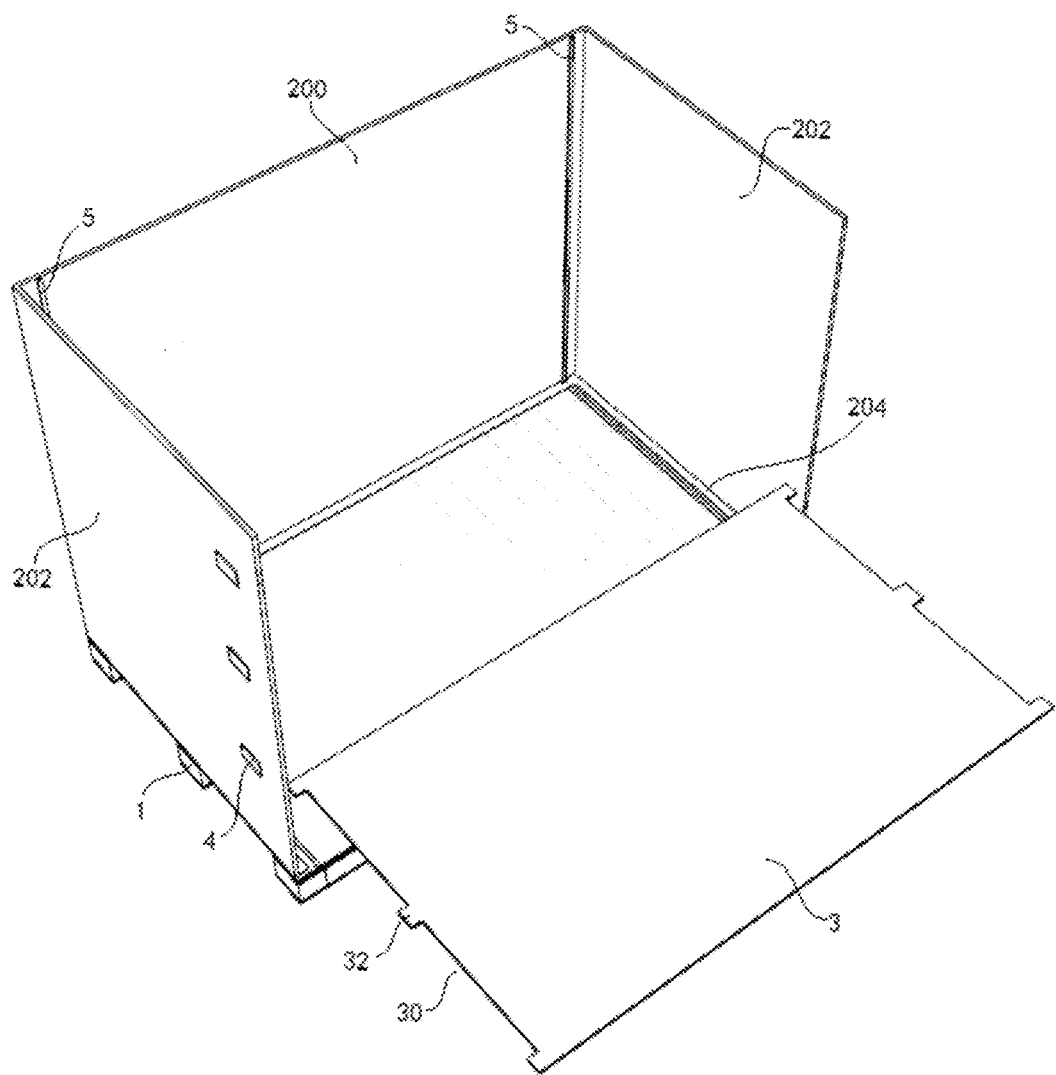
FIG. 4 is a partial schematic structural diagram of a packing box according to an embodiment of the present disclosure.
Figure 5:
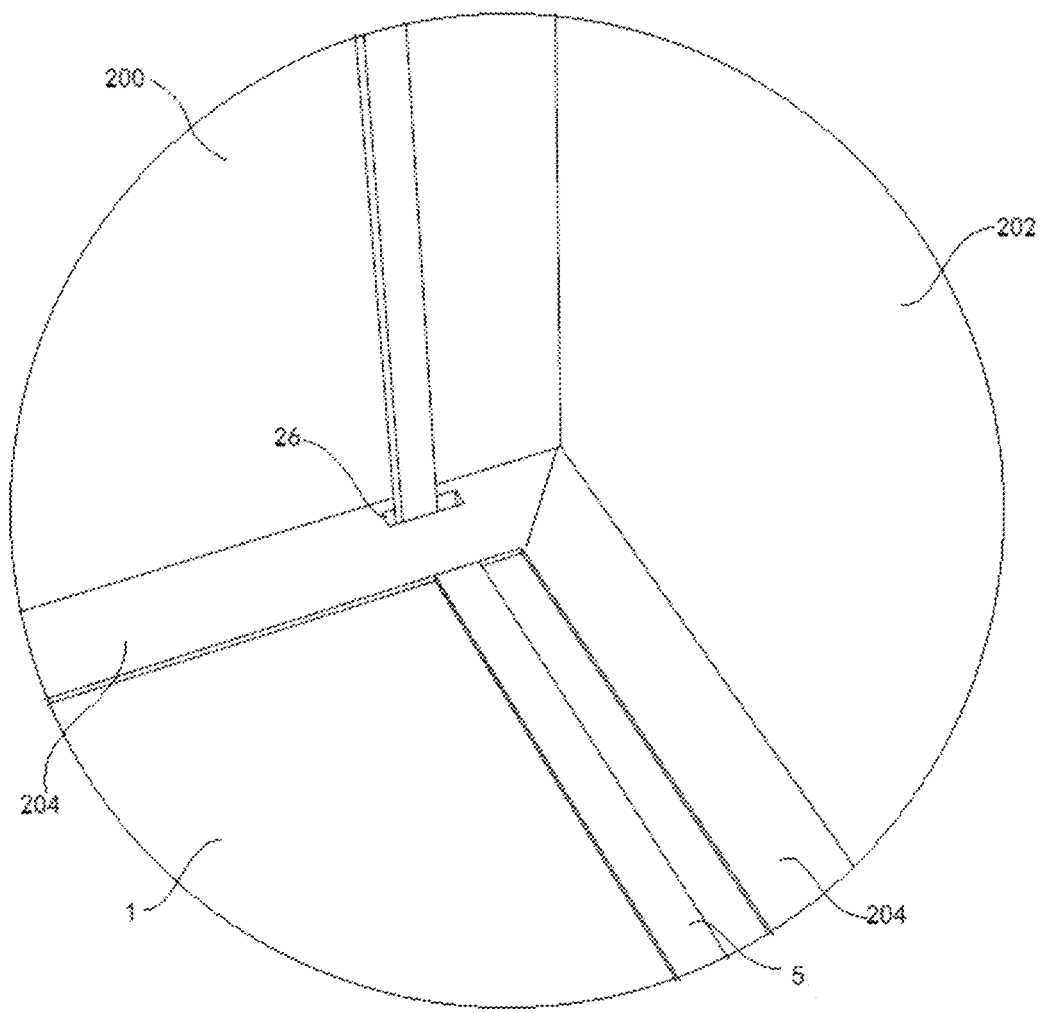
FIG. 5 is a partial enlarged view of FIG. 4.
Figure 6:
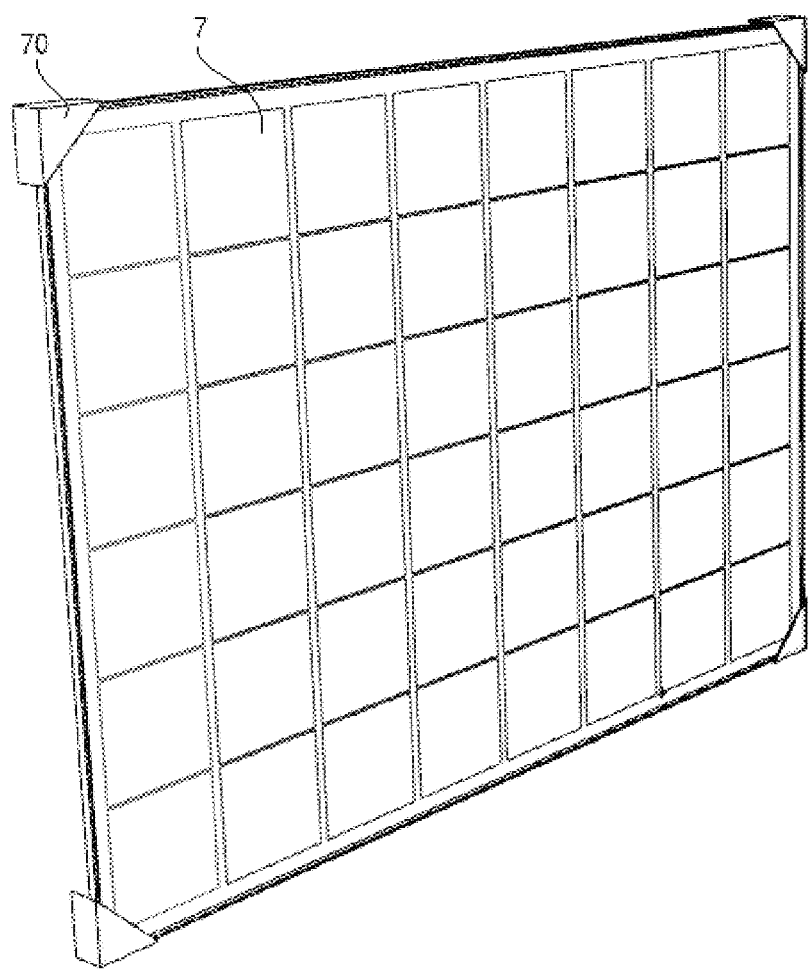
FIG. 6 is a schematic structural diagram of a photovoltaic module according to an embodiment of the present disclosure.

In an embodiment, as shown in FIG. 4, the photovoltaic module packing box according to the present disclosure further includes a press plate 3 for pressing the packing rope 5. The packing rope 5 is pressed by the press plate 3, so that the packing rope 5 is kept in a flat unfolded state, thereby preventing the packing rope 5 from curling or bending which may cause the packing rope 5 difficult to tightly bundle the photovoltaic modules 7. The press plate 3 is embedded into an inner side of the first flanging 204, that is, the edge of the press plate 3 abuts against the inner side of the first flanging 204 in order to limit the position of the pressure plate 3, thereby preventing the pressure plate 3 from moving in the packing box.

In an embodiment, as shown in FIG. 4, the end of the pressure plate 3 along the first direction has at least one groove 30 for the packing rope 5 to pass through, and the groove 30 penetrates through the pressure plate 3 along the thickness direction of the pressure plate 3. The groove 30 may penetrate through the edge of the pressure plate 3 in the first direction. One end of the packing rope 5 penetrates into the packing box from the through hole 26, and the other end of the packing rope 5 penetrates into the packing box from the groove 30, so that the packing rope 5 may be positioned close to the photovoltaic modules 7 as much as possible, thereby increasing the fastening degree of the photovoltaic modules 7 and preventing the photovoltaic modules 7 from shaking or falling.

In an embodiment, the end of the pressure plate 3 in the first direction may be configured as a structure in which the grooves 30 and lugs 32 are alternately distributed. That is, the end of the pressure plate 3 in the first direction includes at least two lugs 32 which are spaced apart along the second direction, and a groove 30 is formed between two adjacent lugs 32. When packing, the photovoltaic modules 7 are arranged in sequence along the second direction, and an edge of the outermost photovoltaic module 7 is positioned within one of the grooves 30, and the packing rope 5 penetrates into the packing box from the groove 30 to make the packing rope 5 closer to the photovoltaic module 7. When unpacking for use, after taking out a part of the photovoltaic modules 7, the edge of the outermost photovoltaic module 7 moves inward and is positioned into another groove 30. At this time, it is only required to penetrate the packing rope 5 into the packing box from the groove 30 again, and the packing rope 5 may still be close to the photovoltaic modules 7.

In an embodiment, as shown in FIG. 1, the packing box according to the present disclosure may further include a top cover 6 through which the enclosure frame 2 is closed from the top, thereby protecting the top of the photovoltaic module 7. The top cover 6 may be provided with an extension part 60 that extends toward a side where the tray 1 is located. The extension part 60 surrounds the outer side of the enclosure frame 2 and forms an overlapping area together with the enclosure frame 2, thereby performing reinforcement to the enclosure frame 2 and preventing damage to the enclosure frame 2. The width of the overlapping area between the extension part 60 and the enclosure frame 2 may be in a range from 100 mm to 120 mm, e.g., the width of the overlapping area may be 100 mm, 102 mm, 104 mm, 105 mm, 107 mm, 108 mm, 110 mm, 112 mm, 113 mm, 115 mm, 118 mm or 120 mm, etc. It can be understood that, when the top of the enclosure frame 2 is an inclined structure, the extension part 60 should also be configured as an inclined structure accordingly.

The above embodiments of the present disclosure are exemplary embodiments, which are not intended to limit the scope of the claims. Any change and modification may be made by those skilled in the art without departing from the scope of the present disclosure. The protection scope of the present disclosure is defined by the claims.

What is claimed is:
1. A photovoltaic module packing box, comprising:
 a tray having an accommodation space;
 a support plate, wherein an edge of the support plate is hinged to an edge of the tray facing away from the accommodation space, and the support plate is lapped on the tray in a horizontal state;
 an airbag assembly arranged in the accommodation space;
 an air valve assembly connected to the airbag assembly by a pipeline; and an enclosure frame connected to the support plate and configured to enclose, together with the support plate, a receiving space for at least one photovoltaic module, and the enclosure frame comprises a fixation part and a movable part connected to the fixation part, wherein the fixation part is fixed to the support plate, and one side of the fixation part is configured as an open structure, wherein the movable part is detachably connected to the open structure of the fixation part, and the movable part and the fixation part together form an annular structure, wherein the photovoltaic module packing box further comprises a stop mechanism, wherein the stop mechanism is connected to the support plate and the tray, respectively, in order to limit rotation of the support plate relative to the tray within a set angle range, wherein the stop mechanism comprises a pin shaft and a stop plate, wherein the pin shaft is fixed to a side wall surface of the support plate, and wherein one end of the support plate is fixed to a side wall surface of the tray, the stop plate has an arc hole, and the pin shaft is sliding-fitted with the arc hole.

2. The photovoltaic module packing box according to claim 1, wherein the set angle range is a range from 3° to 8°.

3. The photovoltaic module packing box according to claim 1, wherein the air valve assembly comprises an inflation valve and a deflation valve;

the inflation valve and the pipeline are integrally formed; and the deflation valve is arranged on a side wall of the pipeline.

4. The photovoltaic module packing box according to claim 3, wherein the deflation valve comprises an air nozzle and a valve cap, and the valve cap is threaded with the air nozzle; and an air hole is provided in a side wall of the air nozzle.

5. The photovoltaic module packing box according to claim 1, wherein at least one partitioning plate is provided in the accommodation space, and the at least one partitioning plate equally divides the accommodation space into at least two fixed spaces; and the airbag assembly comprises at least two airbags which are communicated with each other through a connection hose, and one of the at least two airbags is arranged in respective one of the at least two fixed spaces.

6. The photovoltaic module packing box according to claim 1, further comprising a plurality of corner protectors, each of the plurality of corner protectors is provided with a wrapping space for wrapping one corner of the at least one photovoltaic module.

7. The photovoltaic module packing box according to claim 6, wherein one side of the corner protector has an emboss, and the other side of the corner protector has a dent, the emboss of the corner of one of the at least one photovoltaic module is cooperated with the dent of the corner of an adjacent one of the at least one photovoltaic module.

8. The photovoltaic module packing box according to claim 6, wherein at least two magnet pieces are fixed on two sides of the corner protector, respectively, and one of the at least two magnet pieces of the corner protector of one of the at least one photovoltaic module is fixed by magnetic adsorption to the other one of the at least two magnet pieces of the corner protector of an adjacent one of the at least one photovoltaic module.

9. The photovoltaic module packing box according to claim 1, wherein a bottom of the fixation part has a first flanging fitted to a surface of the support plate, and the first flanging is provided with a through hole for a packing rope to pass through.

10. The photovoltaic module packing box according to claim 9, further comprising a press plate for pressing the packing rope, wherein the press plate is embedded into an interior of the first flanging, and one end of the press plate has at least one groove for a packing rope to pass through.

11. The photovoltaic module packing box according to claim 1, wherein the fixation part comprises a first panel and two side plates connected to two ends of the first panel, and each of the two side plates extends in a direction facing away from the first panel to form an open structure; and the movable part comprises a second panel, and two ends of the second panel are connected to the two side plates, respectively.

12. The photovoltaic module packing box according to claim 11, further comprising an adjustment baffle;

wherein at least one elongated hole is provided in the first panel, and the at least one elongated hole extends in a height direction of the first panel;

at least one slot is provided in the second panel, and the at least one slot is arranged corresponding to the at least one elongated hole; and one side of the adjustment baffle passes through one of the at least one elongated hole and is buckled into a corresponding one of the at least one slot.

13. The photovoltaic module packing box according to claim 11, wherein each of the two side plates is also provided with a scale plate.

14. The photovoltaic module packing box according to claim 11, wherein an inner wall of each of the two side plates is provided with a Velcro® for fixing the at least one photovoltaic module.

15. The photovoltaic module packing box according to claim 12, wherein a height of each of the two side plates is gradually decreased in a direction from the first panel toward the second panel.

16. The photovoltaic module packing box according to claim 13, wherein a top surface of each of the two side plates is configured as an inclined structure, and an inclining angle of the top surface of each of the two side plates is in a range from 15° to 60°.

17. A photovoltaic module package structure, comprising a plurality of photovoltaic modules and a photovoltaic module packing box, wherein the photovoltaic module packing box comprises:

a tray having an accommodation space;

a support plate, wherein an edge of the support plate is hinged to an edge of the tray facing away from the accommodation space, and the support plate is lapped on the tray in a horizontal state;

an airbag assembly arranged in the accommodation space;

an air valve assembly connected to the airbag assembly by a pipeline; and an enclosure frame connected to the support plate and configured to enclose, together with the support plate, a receiving space for at least one photovoltaic module, and the enclosure frame comprises a fixation part and a movable part connected to the fixation part, wherein the fixation part is fixed to the support plate, and one side of the fixation part is configured as an open structure, wherein the movable part is detachably connected to the open structure of the fixation part, and the movable part and the fixation part together form an annular structure, wherein the plurality of photovoltaic modules is accommodated in the photovoltaic module packing box, and two ends of the plurality of photovoltaic modules are fixed to an inner wall of the enclosure frame by a Velcro®, respectively, wherein the photovoltaic module packing box further comprises a stop mechanism, wherein the stop mechanism is connected to the support plate and the tray, respectively, in order to limit rotation of the support plate relative to the tray within a set angle range, wherein the stop mechanism comprises a pin shaft and a stop plate, wherein the pin shaft is fixed to a side wall surface of the support plate, and wherein one end of the stop plate is fixed to a side wall surface of the tray, the stop plate has an arc hole, and the pin shaft is sliding-fitted with the arc hole.

18. A photovoltaic module package structure, comprising a plurality of photovoltaic modules, a packing rope and a photovoltaic module packing box, wherein the photovoltaic module packing box comprises:

a tray having an accommodation space;

a support plate, wherein an edge of the support plate is hinged to an edge of the tray facing away from the accommodation space, and the support plate is lapped on the tray in a horizontal state;

an airbag assembly arranged in the accommodation space;

an air valve assembly connected to the airbag assembly by a pipeline; and an enclosure frame connected to the support plate and configured to enclose, together with the support plate, a receiving space for at least one photovoltaic module, and the enclosure frame comprises a fixation part and a movable part connected to the fixation part, wherein the fixation part is fixed to the support plate, and one side of the fixation part is configured as an open structure, wherein the movable part is detachably connected to the open structure of the fixation part, and the movable part and the fixation part together form an annular structure, wherein a bottom of the fixation part has a first flanging fitted to a surface of the support plate, and the first flanging is provided with a through hole for a packing rope to pass through, wherein the plurality of photovoltaic modules is accommodated in the packing box, and two ends of the plurality of photovoltaic modules are fixed to an inner wall of the enclosure frame by a Velcro®, respectively, wherein the packing rope penetrates into the photovoltaic module packing box from the through hole, and bundles the plurality of photovoltaic modules as an entirety, wherein the photovoltaic module packing box further comprises a stop mechanism, wherein the stop mechanism is connected to the support plate and the tray, respectively, in order to limit rotation of the support plate relative to the tray within aa set angle range, wherein the stop mechanism comprises a pin shaft and a stop plate, wherein the pin shaft is fixed to a side wall surface of the support plate, and wherein one end of the stop plate is fixed to a side to a side wall surface of the tray, the stop plate has an arc hole, and the pin shaft is sliding-fitted with the arc hole.

* * * * *